UNITED STATES PATENT OFFICE.

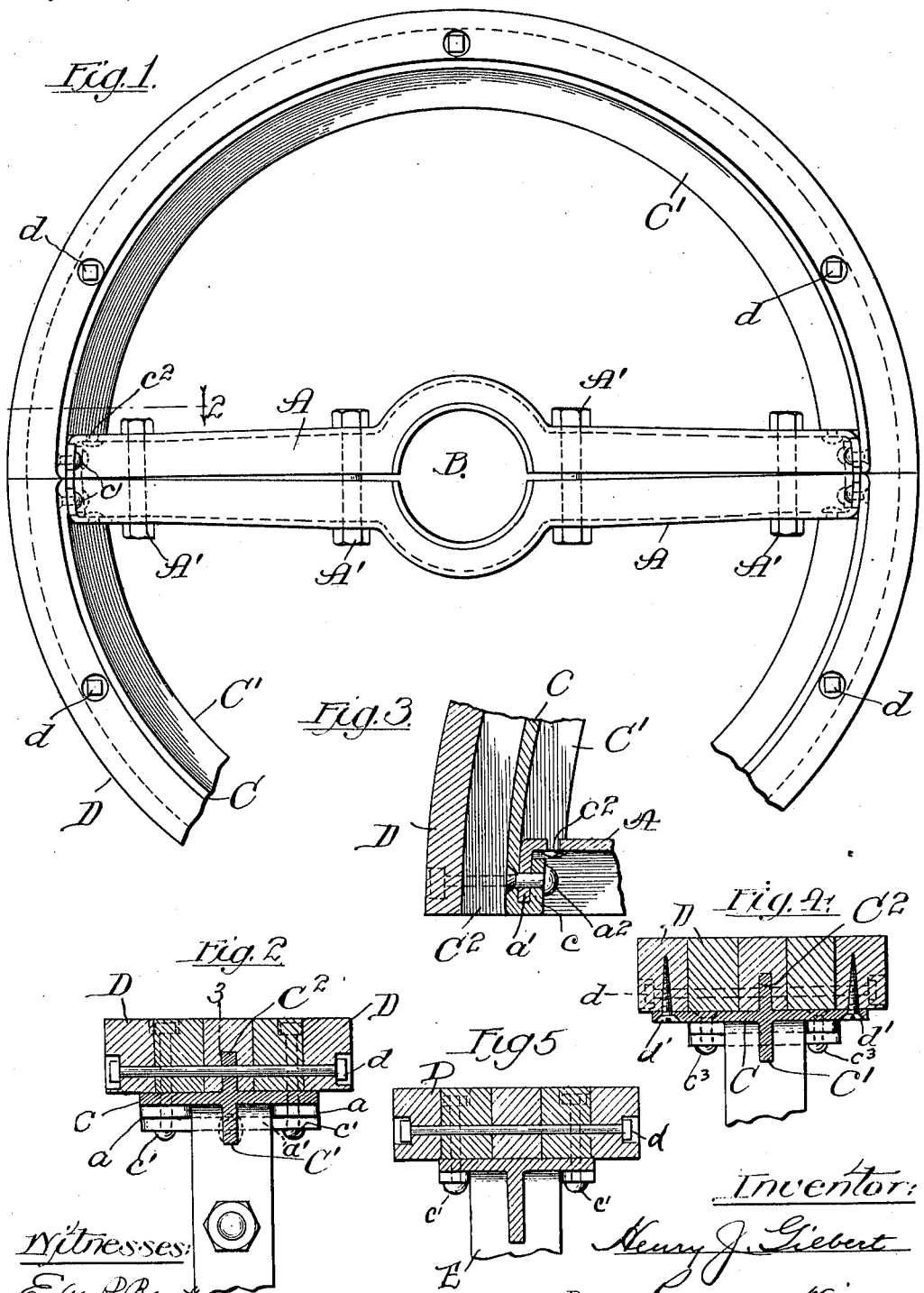

HENRY J. GILBERT, OF SAGINAW, MICHIGAN.

PULLEY.

1,026,796. Specification of Letters Patent. Patented May 21, 1912.

Application filed March 8, 1904. Serial No. 197,075.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a specification.

My invention has relation to pulleys, more particularly to those of the split type, and the object thereof is to produce a simple, efficient and durable pulley of this character in which the rim is made of wood and the remainder thereof, comprising the spoke arms and rim supporting structure, are formed of sheet metal, whereby a combined metal and wood pulley is obtained.

In the accompanying drawing, Figure 1 is a side elevation of a form of pulley selected to embody and illustrate my invention; Fig. 2 a cross-section on the line 2 of Fig. 1; Fig. 3 a section taken on line 3 of Fig. 2; Fig. 4 a cross-section of a modified form of pulley construction; and Fig. 5 a modified form of construction as regards the metal rim segments.

In the present instance, the pulley comprises essentially the pair of diametrically arranged spokes or spoke arms A, centrally expanded to form a shaft opening or bore B, the metal segments, and the wooden rim outside thereof and secured to the outer face thereof. The spoke arms A are substantially the same in construction as those shown in my prior application filed June 9, 1903, Serial No. 160,730, being approximately U-shape in cross-section and provided at their ends with three tongues, that is two laterally bent tongues $a$ and a middle tongue $a'$, bent toward the meeting line or joint of the pulley halves. The spoke-arms and consequently the pulley halves are clamped together by means of clamping bolts A'. The metal segments are two in number, each being a semi-circular iron approximately cross-shape in section and consisting of the flange C and the two webs or stems C' and $C^2$ extending inwardly and outwardly respectively from the flange C. The flange C is somewhat longer than necessary to form a semi-circle and its extended ends are provided with tongues $c$ which are inwardly and backwardly folded to form sockets for the purpose of receiving and engaging the tongues $a$ and $a'$ of the spoke arm. For securing these parts together, in addition to their described interlocking, I prefer to provide a rivet $a^2$ and bolts $c'$, which latter also pass through the wood rim hereinafter described. The inner web or stem C' terminates a distance from the division line or joint between the pulley halves equal to the width of the end of a spoke arm, with the result that the ends of such web rest upon the flattened top of its spoke-arm. As indicated in Fig. 1, the ends of the web are secured to its spoke-arm by means of lugs projecting from such ends of the web and headed over to form rivets $c^2$. However, I do not herein broadly claim such particular construction, as I have made the same the subject matter of a separate application, filed March 8, 1904, Serial No. 197,072.

As is common in wood rim construction, the wood rim herein shown is built up, that is made of a series of strips D and the same is properly grooved or channeled circumferentially on its inner face to receive the outer web or stem $C^2$ of the rim supporting cross-iron, as clearly illustrated in Fig. 2. For the purpose of securing the rim to the metal segments and for clamping the wood strips together, I provide a suitable number of bolts $d$ passing transversely through the said strips and through the web $C^2$.

It is obvious that the wood rim, as well as the metal segments, may be made of any desired width, and yet retain all the features and advantages of my invention.

As illustrated in Fig. 4, the flange C may be extended so as to provide room for attachment of screws $d'$ passing therethrough and into the wood rim to provide means additional to the bolts $d$ for securing the wood rim to the flange C, but in this instance rivets $c^3$ may be used in place of the bolts $c'$ shown in Figs. 1, 2 and 3.

In Fig. 5 I have shown a modified form of metal rim segment provided with a wood rim in which such segment is composed of a T-iron E to which the wood rim D is secured as in Fig. 2.

The pulley resulting from the construction hereinbefore described is, in effect, a combined wood and metal pulley, comparatively simple and inexpensive of manufacture and efficient and durable in service.

I claim:

1. A pulley comprising metal segments having internal sockets formed by reversely bending their meeting ends, spokes engaged by such sockets, and a wood rim secured to the outer face of such segments; substantially as described.

2. A pulley comprising metal segments having an inwardly directed web, and inturned meeting ends, spokes secured to such web and ends, and a wood rim secured to the outer face of such segments; substantially as described.

3. A pulley comprising metal segments having an inner and an outer web, spokes connected with the inner web, and a wood rim connected with the outer web; substantially as described.

4. A pulley comprising metal segments composed of flanges and inwardly and also outwardly directed webs arranged substantially centrally of the segments, spokes interlocked with both the flanges and the inwardly directed webs, and a rim composed of a series of sections secured to said outwardly directed webs; substantially as described.

5. A pulley comprising metal rim segments having outwardly and inwardly projecting webs, spokes connected with both the segments proper and their inwardly projecting webs, and a rim secured both to the outwardly projecting webs and to the segments; substantially as described.

6. A pulley comprising metal rim segments having an outwardly projecting web and also an inwardly projecting web, said webs being arranged substantially central of the segments, spokes connected at their ends with the segments and with the inwardly projecting web, a rim in which said outwardly projecting web is embedded, and fastening means passing transversely through said latter web and through said rim; substantially as described.

7. A pulley comprising metal rim segments having outwardly and inwardly projecting webs, spokes connected with both the segments proper and their inwardly projecting webs, a rim which is arranged upon the outer surface of such segments and in which the outwardly projecting webs are embedded, means for securing the rim to the segments proper; and separate means for securing the rim to said last named webs; substantially as described.

8. A pulley comprising metal rim segments having an outwardly projecting web and also an inwardly projecting web, spokes connected at their ends with the segments, a rim which is made of a series of parallel strips of wood concentric with the axis of rotation of the pulley and in which said outer web is embedded, and means for securing said strips to the outer web and to the rim segments; substantially as described.

9. A pulley comprising metal rim segments having an outwardly projecting web and also an inwardly projecting web, spokes connected at their ends with the segments and with the latter web, a rim which is made of a series of parallel strips of wood concentric with the axis of rotation of the pulley and in which said outer web is embedded, and means for securing said strips to the outer web and to the rim segments comprising fastening bolts passing transversely through them and through said outer web; substantially as described.

10. A pulley comprising a wood rim, metal segments cross-shape in section, and spoke arms connected therewith, said wood rim being engaged by the outer web of such segments; substantially as described.

11. A pulley comprising a wood rim, metal segments, such segments being cross-shape in section, and spoke arms whose ends are interlocked therewith, said wood rim being engaged by the outer web of such segments; substantially as described.

12. A pulley comprising a wood rim, metal segments, such segments being cross-shape in section, and provided at their meeting ends with infolded tongues forming sockets, and spoke arms whose ends are suitably shaped to be engaged by such sockets, said wood rim being secured to the outer face of such segments; substantially as described.

13. A pulley comprising a wood rim, metal segments, such segments being cross-shape in section, and provided at their meeting ends with infolded tongues forming sockets, and spoke arms whose ends are suitably shaped to be engaged by such sockets, said wood rim being secured to the outer web of such segments; substantially as described.

14. A pulley comprising a wood rim, metal segments, such segments being cross-shape in section, and their flange portions provided, at their meeting ends, with tongues which are infolded to form sockets, and spoke arms whose ends are engaged by such sockets, said wood rim being secured to the outer face of such segments; substantially as described.

15. A pulley comprising a wood rim, metal segments, such segments being cross-shape in section and having the ends of their inner web portion resting against the spoke arms, and spoke arms whose ends are connected with the segments, said wood rim being secured to the outer face of such segments; substantially as described.

16. A pulley comprising a wood rim, metal segments, such segments being cross-shape in section, and spoke arms secured to the ends of the inner web of the segments and also connected with the flange portion thereof, said wood rim being secured to the outer face of such segments; substantially as described.

17. A pulley comprising a wood rim, metal segments, such segments being cross-shape in section, and spoke arms connected with the inner side of such segments, whose outer side is connected with said rim; substantially as described.

18. A pulley comprising a wood rim, metal segments, such segments being cross-shape in section, and spoke arms connected therewith, and bolts for securing the rim to said segments; substantially as described.

19. A pulley comprising a wood rim, metal segments, such segments being cross-shape in section, and spoke arms connected therewith, and bolts passing transversely through the rim and the outer web of said segments for securing such rim thereto; substantially as described.

HENRY J. GILBERT.

Witnesses:
S. E. HIBBEN,
LOUIS B. ERWIN.